F. S. SHIRLEY.
CHANDELIER.
No. 189,509. Patented April 10, 1877.
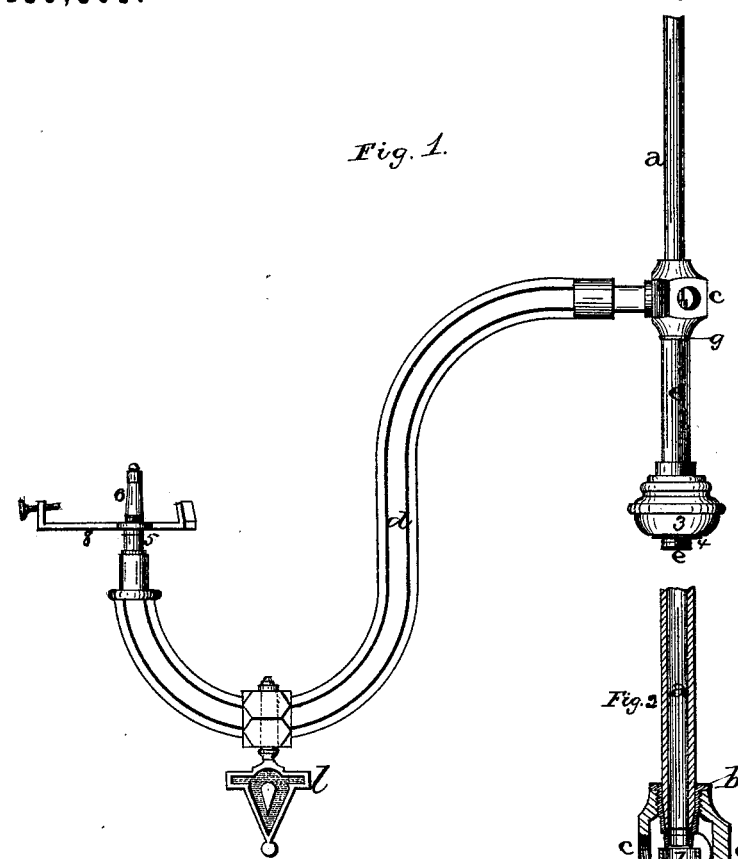
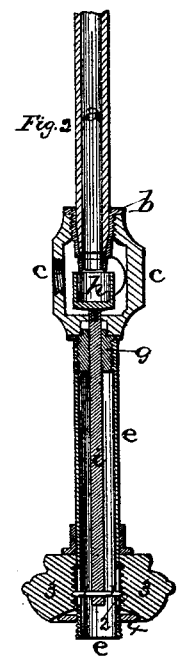
WITNESSES:
J. Wm Garner
Albert J de Jeyk
INVENTOR:
F. S. Shirley
per
F. A. Lehmann, Atty
N. PETERS, PHOTO-LITHOGRAPHER, WASHINGTON, D.C.

UNITED STATES PATENT OFFICE.

FREDERICK S. SHIRLEY, OF NEW BEDFORD, MASSACHUSETTS.

IMPROVEMENT IN CHANDELIERS.

Specification forming part of Letters Patent No. 189,509, dated April 10, 1877; application filed March 6, 1877.

*To all whom it may concern:*

Be it known that I, FRED. S. SHIRLEY, of New Bedford, in the county of Bristol and State of Massachusetts, have invented certain new and useful Improvements in Chandeliers; and I do hereby declare the following to be a full, clear, and exact description of the invention, such as will enable others skilled in the art to which it pertains to make and use it, reference being had to the accompanying drawings, which form part of this specification.

My invention relates to an improvement in chandeliers; and it consists in, first, the manner of regulating the supply of gas to all the arms at once by means of a cup filled with mercury, glycerine, or other equivalent substance, located in a supply-chamber, and which can be raised and lowered by means of a knob or bulb and a rod, so as to increase, decrease, or stop altogether the flow of gas; second, in the arrangement and combination of parts that will be more fully described hereinafter.

The accompanying drawings represent my invention.

Figure 1 is a side elevation of my invention. Fig. 2 is a vertical section of the same. Fig. 3 is a detail view.

*a* represents the usual supply-pipe, which has its lower end screwed into a nose-piece, *b*, the lower end of which piece *b* projects a suitable distance down into the supply-chamber *c*. From this chamber extend the arms *d* and the pipe *e*, which pipe is attached by means of a screw-nut, *g*, which forms a packing-chamber and a bottom for the distributing-chamber *c*. Extending down through this packed nut *g* and the pipe *e* is a small rod, *i*, which has a cup, *h*, filled with mercury, glycerine, or other equivalent substance, attached to its upper end, and a small rod, 1, fastened to its lower end. The rod 1 sticks out horizontally, and has its ends stick through the slots 2 in the lower end of the pipe *e*, so as to catch in the screw-threads in the glass knob, ball, or other ornamental part 3. This knob is fastened to the pipe by means of the flat nut 4, which, while it prevents the knob from coming off, allows it to turn around in either direction. By turning it in one direction the rod 1 is made to ascend in the thread, and thereby raise the rod and the cup upward, so that the mercury or glycerine shall form a seal for the end of the gas-pipe, and prevent the gas from flowing at all, or check the flow to any desired extent.

The manner above described is only one of operating this cup. If preferred, it may be operated directly through the side of the chamber by a cam action; or it may be operated from below by any suitable mechanism that will answer to raise and lower the cup.

Each one of the arms is made of glass, of any desired shape or construction, and has an increased thickness at that point where the metal cock *l* passes through. By means of peculiarly-constructed tools the hole is bored through the arm, and then the tapering bushing is passed through with either an elastic packing or the usual cement between it and the glass.

Having thus described my invention, I claim—

1. In a chandelier, the combination of a pipe, *e*, the cup *h*, nose-piece *b*, a rod, *i*, attached to the cup, and a mechanism for raising and lowering the cup, substantially as shown.

2. A cup, *h*, filled with mercury, glycerine, or other material, in combination with the rod *i*, pipe *e*, having slots 2, rod 1, and knob 3, having screw-threads for the rod 1 to catch in, substantially as described.

In testimony that I claim the foregoing I have hereunto set my hand this 28th day of February, 1877.

FREDK. STACEY SHIRLEY.

Witnesses:
WENDELL H. COBB,
WALTER CLIFFORD.